United States Patent
Heim et al.

(10) Patent No.: US 11,167,933 B2
(45) Date of Patent: Nov. 9, 2021

(54) DEVICE AND METHOD FOR TRANSFERRING MEDICINAL PRODUCTS

(71) Applicant: Uhlmann Pac-Systeme GmbH & Co. KG, Laupheim (DE)

(72) Inventors: Ralf Heim, Laupheim (DE); Michael Kronawitter, Beimerstetten (DE)

(73) Assignee: Uhlmann Pac-Systeme Gmb H & Co. KG, Laupheim (DE)

( * ) Notice: Subject to any disclaimer, the term of this patent is extended or adjusted under 35 U.S.C. 154(b) by 0 days.

(21) Appl. No.: 16/906,069

(22) Filed: Jun. 19, 2020

(65) Prior Publication Data
US 2020/0399074 A1    Dec. 24, 2020

(30) Foreign Application Priority Data

Jun. 19, 2019   (EP) ..................................... 19181106

(51) Int. Cl.
*B65G 25/04*     (2006.01)
*B65G 43/08*     (2006.01)
*B65G 27/34*     (2006.01)

(52) U.S. Cl.
CPC ............. *B65G 43/08* (2013.01); *B65G 27/34* (2013.01); *B65G 2201/02* (2013.01);
(Continued)

(58) Field of Classification Search
CPC ...... B65G 25/04; B65G 25/065; B65G 25/08; B65G 25/10; B65G 25/12; B65G 37/005; B65G 42/08; B65G 47/56; B65G 47/57; B65G 47/58; B65G 47/766; B65G 47/78; B65G 47/82; B65G 47/642; B65G 43/08

USPC .... 198/743, 744, 359, 360, 361, 364, 369.7, 198/532, 539, 451, 452, 550.4, 568; 209/921, 924
See application file for complete search history.

(56) References Cited

U.S. PATENT DOCUMENTS 3,900,718 A * 8/1975 Seward ................. G06M 1/101
                                                             702/128
4,146,123 A * 3/1979 Cottrell .............. B65G 47/1421
                                                             198/382
(Continued)

FOREIGN PATENT DOCUMENTS

CA         2914115 A1    6/2017
DE    102008027624 A1   12/2009
(Continued)

OTHER PUBLICATIONS

International Search Report dated Dec. 9, 2019.

*Primary Examiner* — Joseph A Dillon, Jr.
(74) *Attorney, Agent, or Firm* — Dickinson Wright PLLC

(57) ABSTRACT

A method for transferring medical products comprises the steps of conveying medical products on an oscillating conveyor having a plurality of conveying lanes arranged next to each other to a delivery area of the conveyor lanes and from the delivery area into at least one shaft; detecting a defective product in one of the conveying lanes; and activating a diverter device for defective products, which is arranged adjacent to the delivery area of this conveying lane, when a defective product is detected, wherein the diverter device, upon activation, is shifted or pivoted into an activated position, in which the diverter device is located in a transport path of the defective product.

8 Claims, 13 Drawing Sheets

(52) U.S. Cl.
CPC ............... *B65G 2203/0208* (2013.01); *B65G 2203/042* (2013.01); *B65G 2811/0657* (2013.01)

(56) References Cited

U.S. PATENT DOCUMENTS

| | | | | |
|---|---|---|---|---|
| 4,709,536 | A * | 12/1987 | Hartness | B65B 21/06 53/247 |
| 4,804,078 | A * | 2/1989 | Scata' | B65G 47/646 198/346.2 |
| 4,819,784 | A * | 4/1989 | Sticht | B07C 5/02 198/395 |
| 5,518,102 | A | 5/1996 | Hershline | |
| 5,826,696 | A * | 10/1998 | Rupp | B07C 5/36 198/392 |
| 7,004,353 | B2 * | 2/2006 | Yamamoto | B65B 5/103 221/277 |
| 7,156,263 | B2 * | 1/2007 | Hooper | G01F 13/003 198/532 |
| 7,207,428 | B2 * | 4/2007 | Huttner | B65G 21/2072 198/444 |
| 7,223,060 | B2 * | 5/2007 | Weidenmuller | B29C 35/16 406/159 |
| 7,878,366 | B2 * | 2/2011 | Cicognani | B65G 47/848 221/7 |
| 8,025,143 | B2 * | 9/2011 | Baumstimler | B65G 47/71 198/446 |
| 8,220,657 | B2 * | 7/2012 | Cicognani | B65B 35/14 221/7 |
| 8,406,916 | B2 * | 3/2013 | Bentele | B65B 35/18 700/216 |
| 8,573,382 | B2 * | 11/2013 | Bastasch | B65G 47/24 198/390 |
| 8,651,264 | B2 * | 2/2014 | Spindler | B65G 47/682 198/446 |
| 9,033,447 | B2 * | 5/2015 | Morita | B41J 3/407 347/16 |
| 9,598,246 | B2 * | 3/2017 | Hockett | B65G 47/684 |
| 9,840,376 | B2 * | 12/2017 | White | B65G 47/1492 |
| 10,464,761 | B1 * | 11/2019 | Doak | B65G 51/02 |
| 10,507,986 | B2 * | 12/2019 | Rogan | B65G 15/28 |
| 10,577,186 | B2 * | 3/2020 | Bassani | B65G 27/22 |
| 10,968,001 | B2 * | 4/2021 | Van Der Meij | B65B 39/007 |
| 2005/0217208 | A1 * | 10/2005 | Cicognani | B65B 5/08 53/54 |
| 2007/0193854 | A1 | 8/2007 | Eaton et al. | |
| 2008/0307757 | A1 * | 12/2008 | Heim | B65G 27/16 53/500 |
| 2011/0088810 | A1 * | 4/2011 | Cicognani | B65B 5/103 141/192 |
| 2019/0352103 | A1 * | 11/2019 | Batchman | B65G 47/24 |
| 2020/0319117 | A1 * | 10/2020 | Boissonneault | B65G 27/04 |
| 2021/0032049 | A1 * | 2/2021 | Hicks | B65G 27/10 |
| 2021/0101755 | A1 * | 4/2021 | Wagner | B65G 47/902 |

FOREIGN PATENT DOCUMENTS

| | | |
|---|---|---|
| EP | 2003074 A1 | 12/2008 |
| EP | 2246278 A2 | 11/2010 |
| JP | 2015059016 A | 3/2015 |
| WO | 03097459 A2 | 11/2003 |
| WO | 2016132281 A1 | 8/2016 |

* cited by examiner

DEVICE AND METHOD FOR TRANSFERRING MEDICINAL PRODUCTS

CROSS-REFERENCE TO RELATED APPLICATIONS

This application claims the benefit of priority under 35 U.S.C. § 119 to European Patent Application No. 19 181 106.6, filed Jun. 19, 2019, the contents of which are incorporated herein by reference in their entirety.

FIELD

The present disclosure relates to a device and a method for transferring medicinal products (i.e. medical products) in the form of tablets, capsules, coated tablets, or caplets.

BACKGROUND

Defective products are not accepted in pharmaceutical packaging processes. This pertains both to the filling of tablets into blister packs and to the filling of tablets into so-called bottles, i.e., containers usually made of plastic or glass, each provided with a cap.

The detection of defective products is given particular attention in the pharmaceutical industry. There are many different detection devices for this purpose, based on a wide variety of principles. They can be used, for example, to inspect a size and shape of tablets, a composition of ingredients of a tablet, or a degree to which capsules are filled.

During a process of filling containers with medical products, monitoring mechanisms of this type are used while the medical products are traveling forward on a vibrating or oscillating conveyor. When a defective product is detected, in most cases it is not just the individual defective product which is discarded but rather an entire lot or batch of blister packs or bottles to be filled in this work step. This must be done before a new filling process with new blister packs or bottles can begin again from the beginning. This results in a great amount of discarded medical products which are good in themselves, and such waste should be avoided.

For this reason, devices have already been developed in the past which blow out defective products from a side as they are falling down a filling shaft or which pick out individual products from the oscillating conveyor by means of a suction gripper lowered from above onto the conveyor.

SUMMARY

The present disclosure provides a device having a simple mechanical structure and by means of which individual defective products can be ejected reliably and to provide a corresponding method for transferring medical products.

According to an aspect of the present disclosure, a device for transferring medical products comprises an oscillating conveyor having a plurality of conveying lanes arranged next to each other for conveying the medical products to a delivery area of the plurality of conveying lanes; a detection device for detecting defective products in each of the plurality of conveying lanes; and at least one shaft having a receiving opening arranged adjacent to the delivery area of at least one of the plurality of conveying lanes for conveying the medical products emerging from one or more of the plurality of conveying lanes to a filling area, wherein the plurality of conveying lanes and the at least one shaft together define a plurality of transport paths for the medical products. A diverter unit for defective products is arranged adjacent to the delivery area of the plurality of conveying lanes and which comprises at least one diverter device. A control unit is configured to activate the at least one diverter device upon detection of a defective product by the detection device. The at least one diverter device is supported shiftably or pivotably or slidably or rotatably and is movable between a deactivated position, in which the diverter device is arranged outside of each of the transport paths of the medical products, and an activated position, in which the diverter device is arranged in at least one of the transport paths of the medical products.

With this configuration, it is possible to guarantee that individual defective products will be ejected with an extremely high degree of reliability, while at the same time the overall device obtained has a relatively simple structure.

In a preferred embodiment, in the activated position, the at least one diverter device is arranged in or adjacent to the delivery area of at least one of the plurality of conveying lanes and causes a change in at least one of the transport paths of the medical products.

In a particularly preferred embodiment, this is achieved in that, in the activated position, the at least one diverter device forms an extension of at least one of the plurality of conveying lanes. Thus, the diverter device, when in the activated position, is configured as a mechanically passive element, which mechanically interrupts the respective transport path in a reliable manner and can thus be used to eject defective products effectively.

For the sake of a configuration having a simple structural design, in the activated position, the at least one diverter device is decoupled from and therefore does not participate in vibrations of the plurality of conveying lanes. Even if the oscillating conveyor is in operation and is conveying the defective product toward the diverter device, the diverter device can therefore remain stationary, which reduces the mechanical complexity.

It is particularly preferred that the at least one diverter device is shiftable in a substantially horizontal direction. As a result, the diverter device, when in the deactivated position, can easily free or uncover the receiving opening of the shaft and, when in the activated position, easily close the receiving opening of the shaft.

It is particularly preferred that the diverter unit comprises a separate diverter device for each of the plurality of conveying lanes. Thus, individual defective products can be removed from each individual conveying lane in isolation without the need to eject good products from other conveying lanes of the same oscillating conveyor. Wasting good products is thus prevented.

In one embodiment, the diverter unit comprises at least one suction device for defective products entering the diverter unit. Thereby, quick and reliable removal of defective products entering the diverter unit can be achieved.

In a preferred embodiment, the detection device comprises a camera system having at least one camera arranged above at least one of the plurality of conveying lanes. Cameras are particularly effective at detecting in particular the size, shape, and color of tablets and offer a high degree of resolution.

According to another aspect of the present disclosure, a method for transferring medical products comprises the steps of:

conveying medical products on an oscillating conveyor having a plurality of conveying lanes arranged next to each other to a delivery area of the plurality of conveying lanes and from the delivery area into at least one shaft;

detecting a defective product in one of the plurality of conveying lanes; and activating a diverter device for defective products when a defective product is detected, the diverter device being arranged adjacent to the delivery area of the conveying lane in which the defective product was detected, wherein the diverter device, when activated, is shifted or pivoted into an activated position, in which the diverter device is located in a transport path of the defective product.

By means of this method, it is possible to eject isolated defective products in a simple and reliable manner.

In a preferred embodiment, the diverter device, when in the activated position, causes a change in the transport path of the medical products in the delivery area of the conveying lane in which the defective product was detected.

In this context, it is particularly preferred that the diverter device, when in the activated position, forms an extension of the conveying lane.

To achieve a more rapid ejection of the defective product and to speed up the overall process, it is preferred that the defective product, which has entered the diverter device, is removed by suction.

To increase the reliability of the ejection process, it is preferred that the detection of the defective product occurs at least in the delivery area of the conveying lane. In this way, the time at which the diverter device is activated can be determined particularly accurate.

The detection is preferably carried out by means of a camera system. The camera system can also monitor the defective product over a certain period of time before the defective product arrives in the delivery area.

To achieve a further increase in the reliability of the process of ejecting a defective product, a counting sensor associated with the respective shaft is preferably in a monitoring mode during the diversion of the defective product, and an interrupt sequence of the filling process is initiated upon counting of a product. In this case, it is to be assumed that the defective product, in spite of all the measures taken, has arrived in the shaft, which means that additional measures are now required. Such interrupt sequences usually involve a machine stop and the discarding of the blister packs or bottles to be filled at the time in question.

Finally, a particularly reliable ejection of the defective product is preferably achieved in that the conveying lane in which the defective product was detected is turned to a motionless state when the defective product on the conveying lane is arranged in or adjacent to the delivery area, and the conveying lane is not set into oscillation again until after the diverter device has been moved into the activated position.

DETAILED DESCRIPTION

Figure 1:
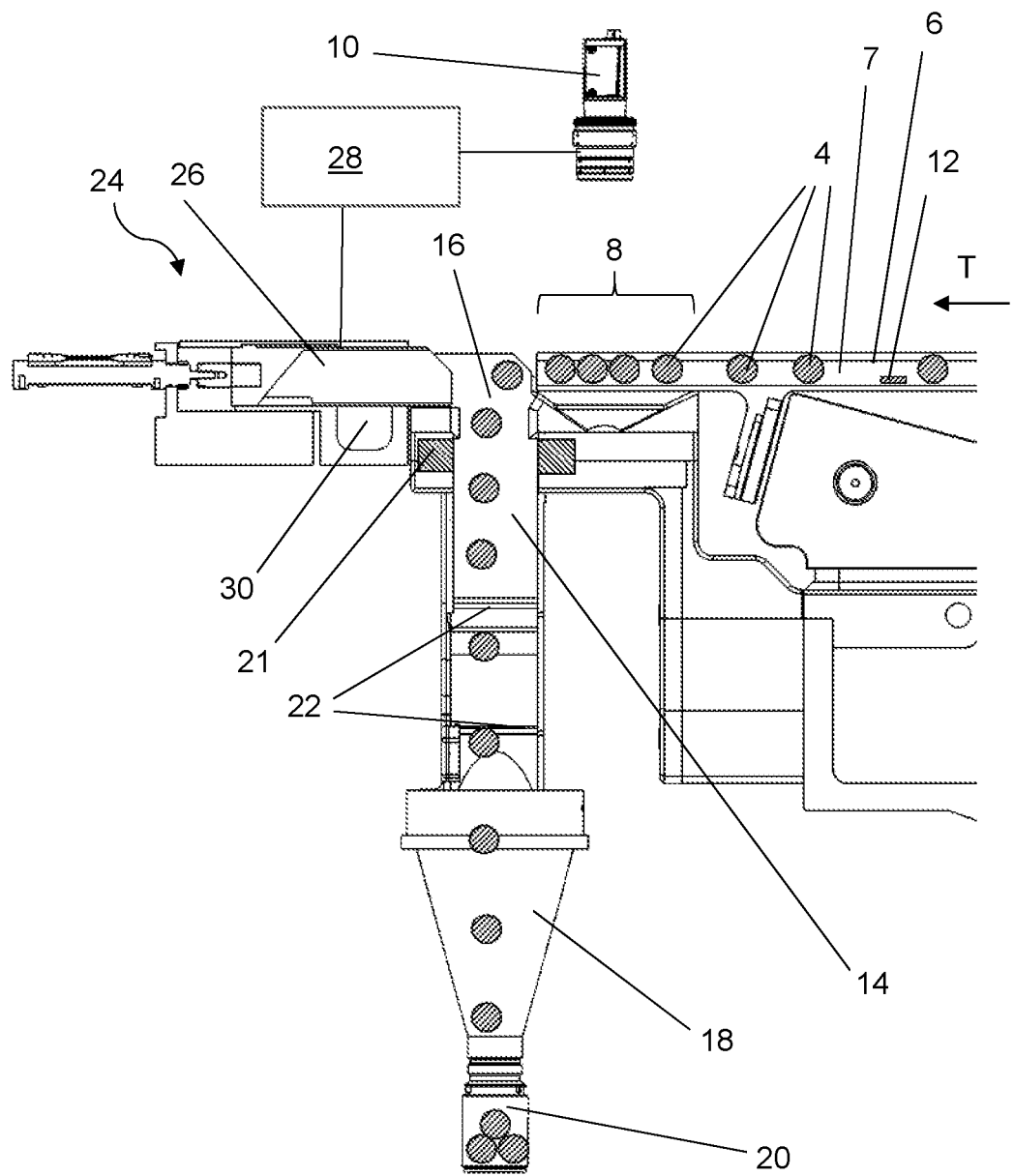
FIG. 1 shows a schematic, cross-sectional view of one embodiment of a device for transferring medical products with a diverter device in a deactivated position.
Figure 2:
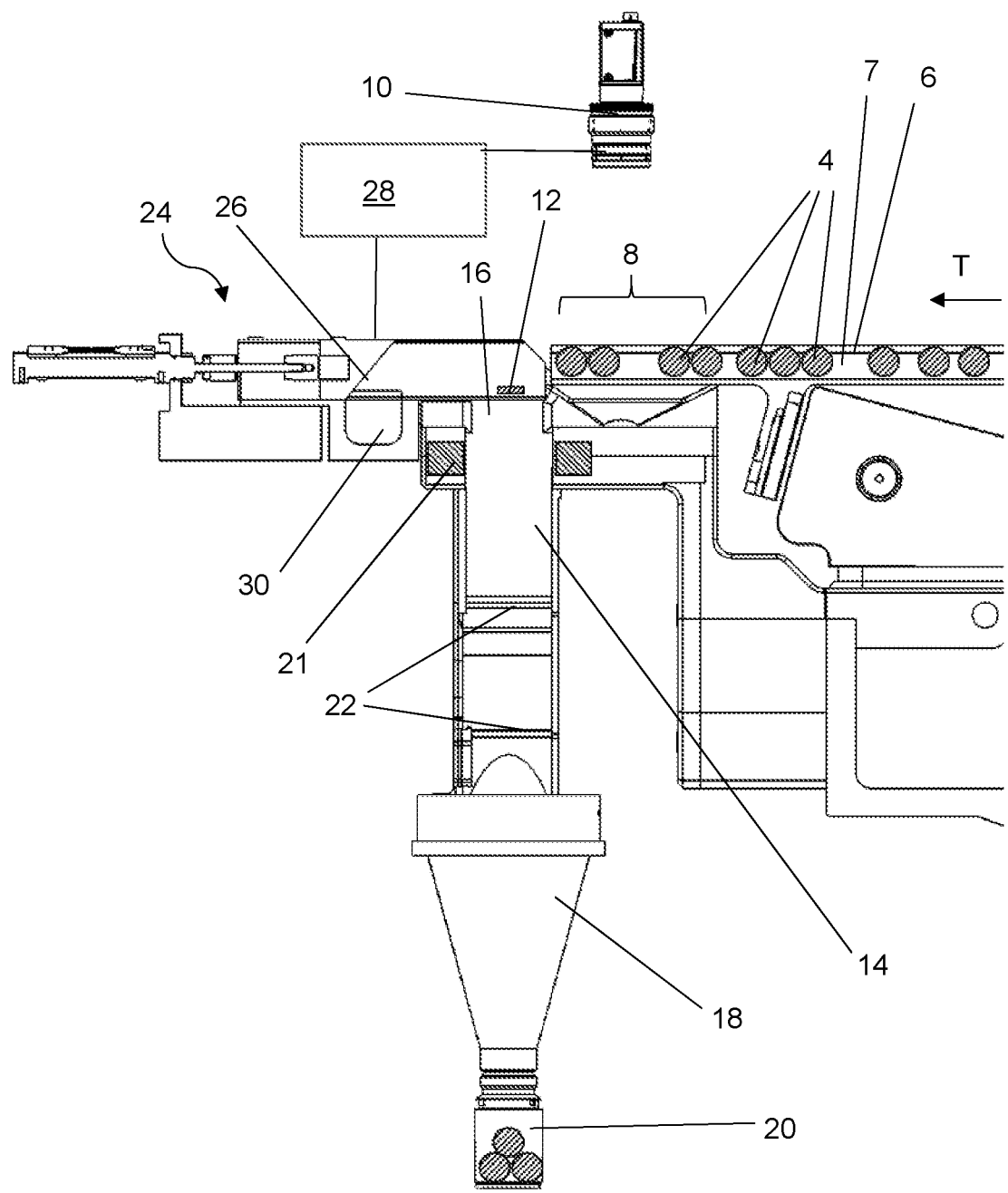
FIG. 2 shows a schematic, cross-sectional view of the device for transferring medical products of FIG. 1 with the diverter device in an activated position.

FIGS. 1 and 2 show a first embodiment of a device for transferring medical products. The medical products 4 may be in the form of tablets, capsules, caplets, or coated tablets.

The device comprises an oscillating conveyor 6 having a plurality of conveying lanes 7 for conveying the medical products 4 from a receiving area (not shown) to a delivery area 8 of the conveying lanes 7. Of the plurality of conveying lanes 7, only one conveying lane 7 is to be seen in the illustrated cross-sectional view. The additional conveying lanes are offset to the illustrated conveying lane 7 in a direction perpendicular to the plane of the drawing and extend parallel to the illustrated conveying lane 7 behind or forward of the plane of drawing. A transport direction of the medical products 4 on the oscillating conveyor 6 is identified by an arrow T. There are many different ways known in the prior art in which the medical products 4 can be loaded onto the oscillating conveyor 6.

Conveying the medical products 4 on the oscillating conveyor 6 is carried out by means of vibrations of the oscillating conveyor 6. The oscillating conveyor 6 can be at a slight angle to the horizontal, in a direction toward the delivery area 8.

The medical products 4 are conveyed in conveying lanes 7, which are usually configured as groove-like slots or channels, which are open at the top and extend in the transport direction T. An oscillating conveyor 6 usually comprises a plurality of conveying lanes 7 arranged next to each other in a direction transverse to the transport direction T. In certain areas of application, an oscillating conveyor 6 comprises several conveying segments, which are arranged next to each other in a direction transverse to the transport direction T, wherein a plurality, e.g., four to eight, conveying lanes 7 extend next to one another in each conveying segment. The oscillating conveyor 6 can also be segmented in the transport direction T, and the individual segments can have different angles of inclination and/or be driven to perform different types of oscillations.

The delivery area 8 of a conveying lane 7 is defined as the area adjacent to the downstream end, relative to the transport direction T, of the oscillating conveyor, and has a width of approximately 1 to 10 cm, preferably between 2 and 8 cm. A detection device 10 for detecting defective products 12 is provided for each conveying lane 7. The detection device 10 can preferably be arranged above the respective conveying lane 7, as shown in FIGS. 1 and 2, and particularly preferable above the delivery area 8 of the respective conveying lane 7. The detection device 10 can also cover a wider detection area, which includes the delivery area 8. It is also possible for the detection device 10 to be arranged farther upstream above the oscillating conveyor 6 or to arrange several individual detection devices 10 at various points above the oscillating conveyor 6.

For example, the detection device 10 can be a camera or video system, which comprises one or more individual cameras. Such a camera system is particularly effective in recognizing defective products 12 in the form of broken pieces. Monitoring by the detection device 12 can be a continuous video monitoring. It may however be sufficient to take pictures at certain times and to evaluate them. A defective product 12 can also be a medical product which does not fulfill other predetermined criteria with respect to its shape, color, active ingredient composition, etc. The detection device 10 can also comprise an NIR sensor or some other type of sensor.

After the medical products 4 in question have left the oscillating conveyor 6, they fall through a receiving opening 16 into a shaft 14, which is arranged at or adjacent to an edge of the delivery area 8 of the respective conveying lane 7 in question. In particularly preferred embodiments, a separate shaft 14 is associated with each conveying lane 7. It is also possible, however, for the medical products 4 of a plurality of conveying lanes 7 to fall into the same shaft 14. In the shaft 14, the medical products 4 are conveyed to a filling area 18, usually by gravity, where they are loaded into appropriate containers 20. The containers are preferably so-called "bottles", i.e., containers made of plastic or glass and provided with caps, but they can also be blister packs or other types of containers.

Each conveying lane 7 of the oscillating conveyor 6, together with the associated shaft 14, defines a transport path for the medical products 4. A plurality of these transport paths is therefore usually arranged next to each other in a direction transverse to the transport direction T.

In the shaft 14, a counting sensor 21 for counting the medical products 4 falling through the shaft 14 can be provided, preferably adjacent to the receiving opening 16. Such a counting sensor 21 is configured as a light barrier, for example, or as a light grid.

In the shaft 14, one or more slide valves 22 can be provided to simplify the loading process; these slide valves 22 being able to open or close the shaft 14. A predetermined number of medical products 4 is usually allowed to collect above an upper slide valve 22; then the upper slide valve 22 is retracted; the medical products 4 drop down one level in the shaft 14 to a lower slide valve 22, which in turn releases the predetermined number of medical products 4 into the respective container 20. In the meantime, the upper slide valve 22 has already been pushed back into a position in which it closes the shaft 14, so that newly arriving medical products 4 are again collected above the upper slide valve 22.

To eject the defective products 12 detected by the detection device 10, a diverter unit 24 is provided, which comprises at least one, preferably a plurality of diverter devices 26 arranged next to each other. Preferably, each conveying lane 7 of the oscillating conveyor 6 is provided with its own diverter device 26. A common diverter device 26 for several adjacent conveying lanes 7 can also be provided, however.

Each diverter device 26 is arranged adjacent to the delivery area 8 of the associated conveying lane 7 of the oscillating conveyor 6. Each diverter device 26 is supported shiftably or pivotably or slidably or rotatably and can be moved between a deactivated position (FIG. 1), in which the diverter device 26 is arranged outside the transport path of the medical products 4, and an activated position (FIG. 2), in which the diverter device 26 is arranged in the transport path of the medical products 4. In the exemplary embodiment, the diverter device 26, when in the deactivated position of FIG. 1, clears (i.e., uncovers) the receiving opening 16 of the shaft 14; and, when in the activated position according to FIG. 2, the diverter device 26 closes the receiving opening 16 of the shaft 14. Switching the diverter device 26 between the activated position and the deactivated position is accomplished by means of a control device 28, which converts results of the detection of defective products 12 by the detection device 10 into a corresponding control signal for the diverter device 26.

If a plurality of diverter devices 26 is provided next to each other, each individual diverter device 26 is preferably actuatable separately by the control device 28. In this way, it is possible, for example, to separate only one conveying lane 7 of the oscillating conveyor 6, i.e., the conveying lane 7 on which a defective product 12 has been detected, from the associated shaft 14 by activation of the associated diverter device 26, while the other conveying lanes 7 continue to operate normally.

In the embodiment of the device shown in FIGS. 1 and 2, the diverter device 26 is shiftable or slidable from the deactivated position into the activated position. When in the activated position, the diverter device 26 forms an extension of the conveying lane 7. Preferably, the diverter device 26 is also decoupled from oscillations of the conveying lane 7 when in the activated position. In the embodiment shown here, the diverter device 26 is shifted horizontally. It is also conceivable that the diverter device 26 could be shifted downward at an acute angle to the horizontal.

The overall effect which is achieved is that the diverter device 26, when in the activated position in or adjacent to the delivery area 8 of the conveying lane 7, changes the transport path of the medical products 4. In the activated position shown in FIG. 2, a bottom area of the diverter device 26 is directly adjacent to the delivery area 8 of the conveying lane 7 and lies minimally lower than a bottom area of the conveying lane 7. It is also conceivable, however, that the bottom area of the diverter device 26, at a transfer point, is arranged in one plane with the bottom area of the associated conveying lane 7 or even lies minimally higher than the bottom area of the conveying lane 7.

So that the defective product 12 entering the diverter device 26 can be carried away more quickly and more effectively, the diverter unit 24 comprises at least one suction device 30. By temporary controlled application of a vacuum, the defective product 12 which has entered the diverter device 26 is drawn away and discarded.

Figure 3:
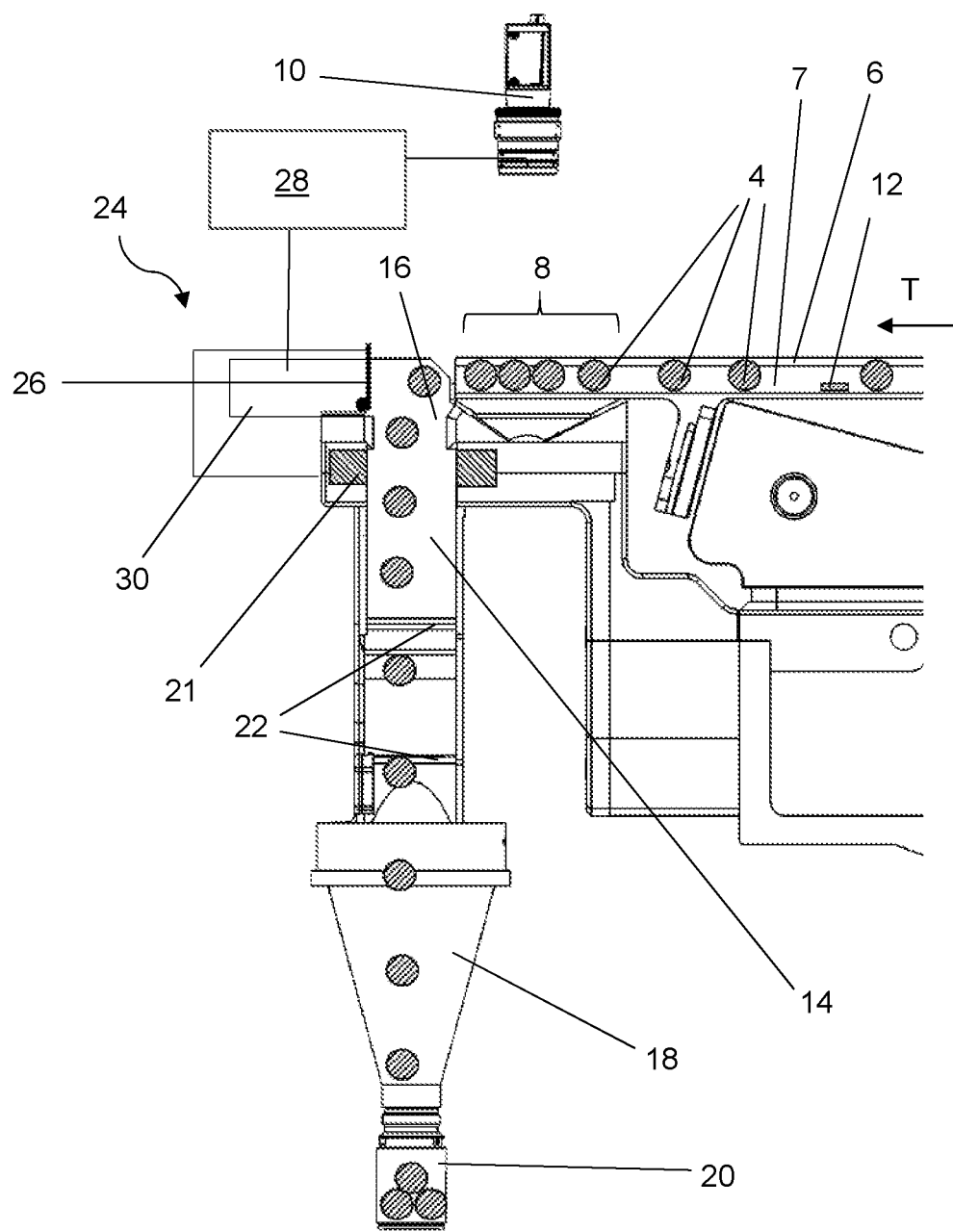
FIG. 3 shows a schematic, cross-sectional view of an alternative embodiment of a device for transferring medical products with the diverter device in a deactivated position.
Figure 4:
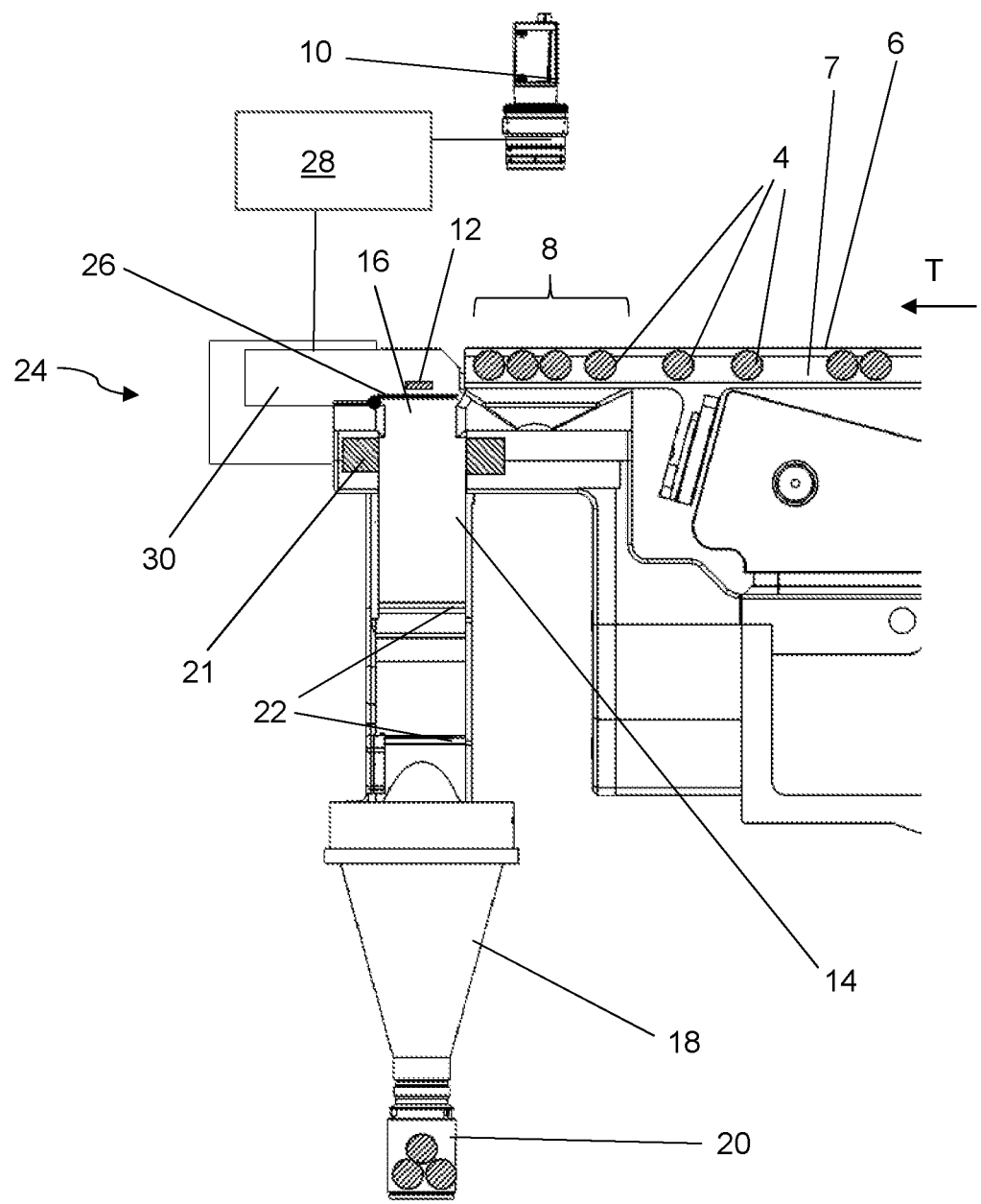
FIG. 4 shows a schematic, cross-sectional view of the device for transferring medical products of FIG. 3 with the diverter device in an activated position.

Most elements of the alternative second embodiment of the device for transferring medical products 4 shown in FIGS. 3 and 4 are the same as those of the embodiment according to FIGS. 1 and 2. Same reference numbers designate identical elements. Unless otherwise indicated, the associated description of the embodiment of FIGS. 1 and 2 also applies to the embodiment of FIGS. 3 and 4.

In contrast to the embodiment of FIGS. 1 and 2, the diverter device 26 according to FIGS. 3 and 4 is not shiftable between the deactivated position and the activated position but rather is pivotable or rotatable. In the deactivated position shown in FIG. 3, the diverter device 26 has been pivoted upward and uncovers the receiving opening 16 of the shaft 14. In the activated position shown in FIG. 4, the diverter device 26 has been pivoted into a substantially horizontal plane and covers the receiving opening 16 of the shaft 14.

In all of the embodiments, pneumatic cylinders are preferably used as drives to move the diverter devices 26. The use of linear motors, stepping motors, or servomotors is also conceivable.

A method for transferring medical products 4 is now described in greater detail with reference to FIGS. 5 to 13.

Figure 5:
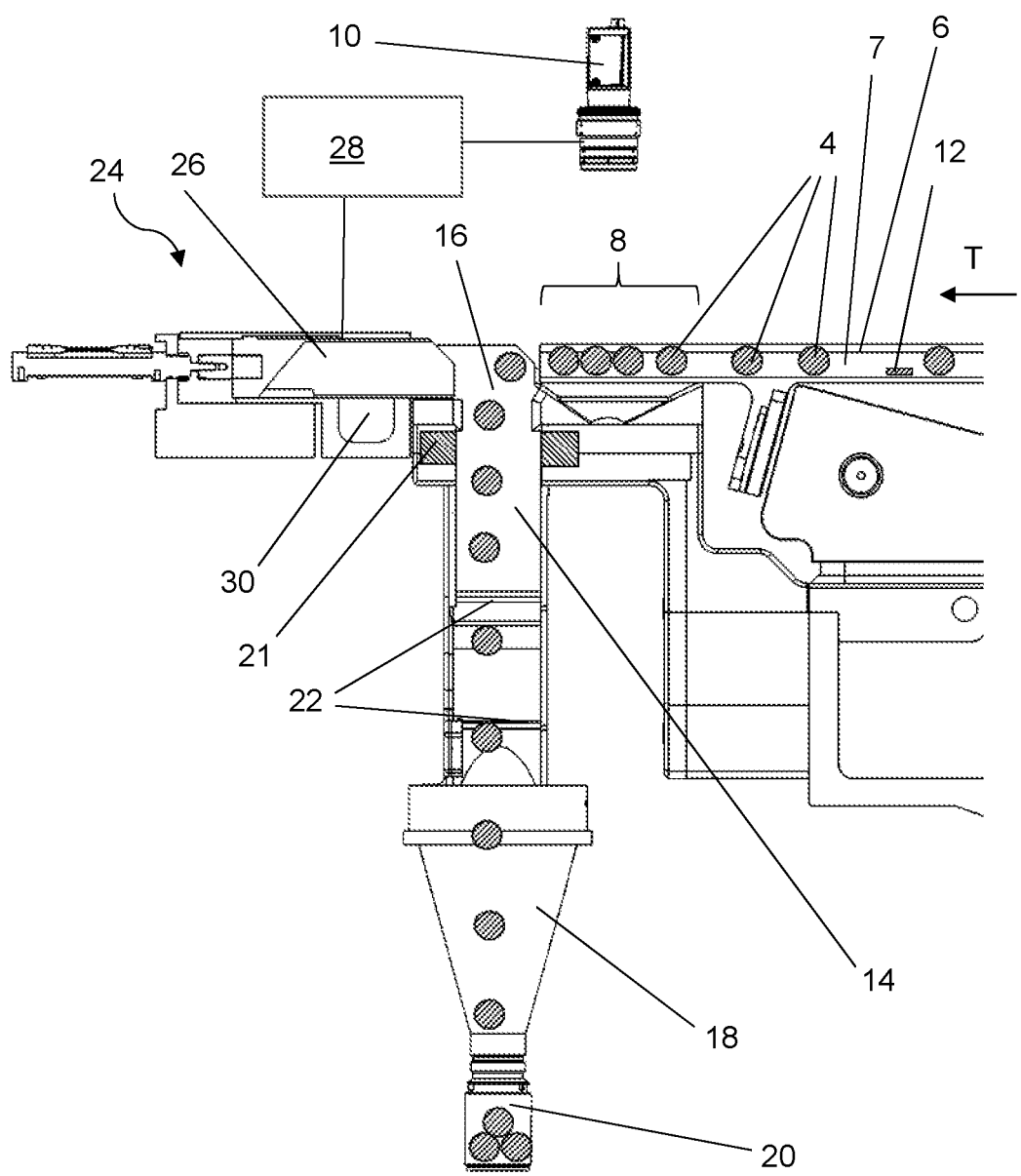
FIGS. 5-13 show schematic, cross-sectional views of the device of FIGS. 1 and 2 at various times during a method for transferring medical products.
Figure 6:
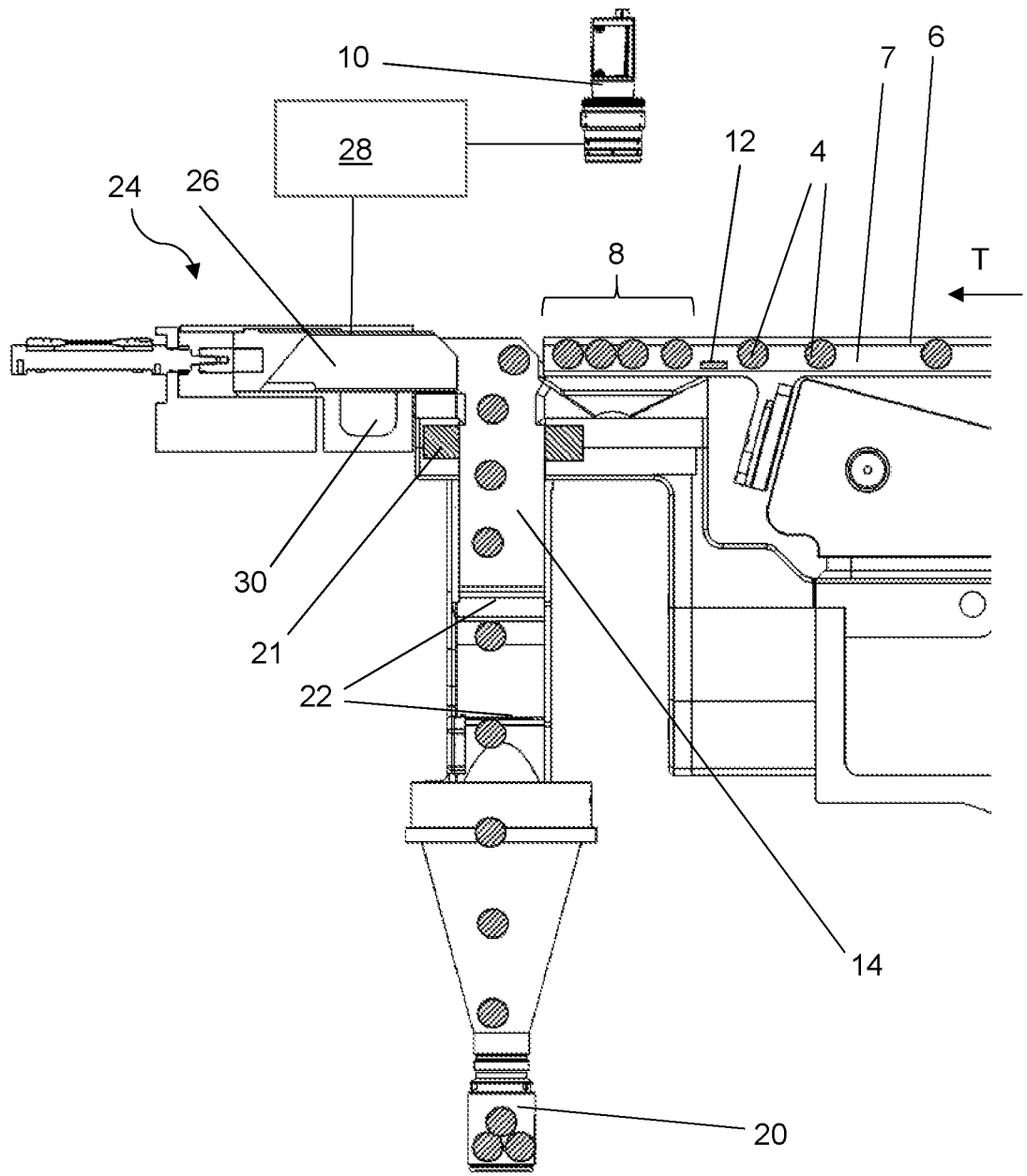
Figure 7:
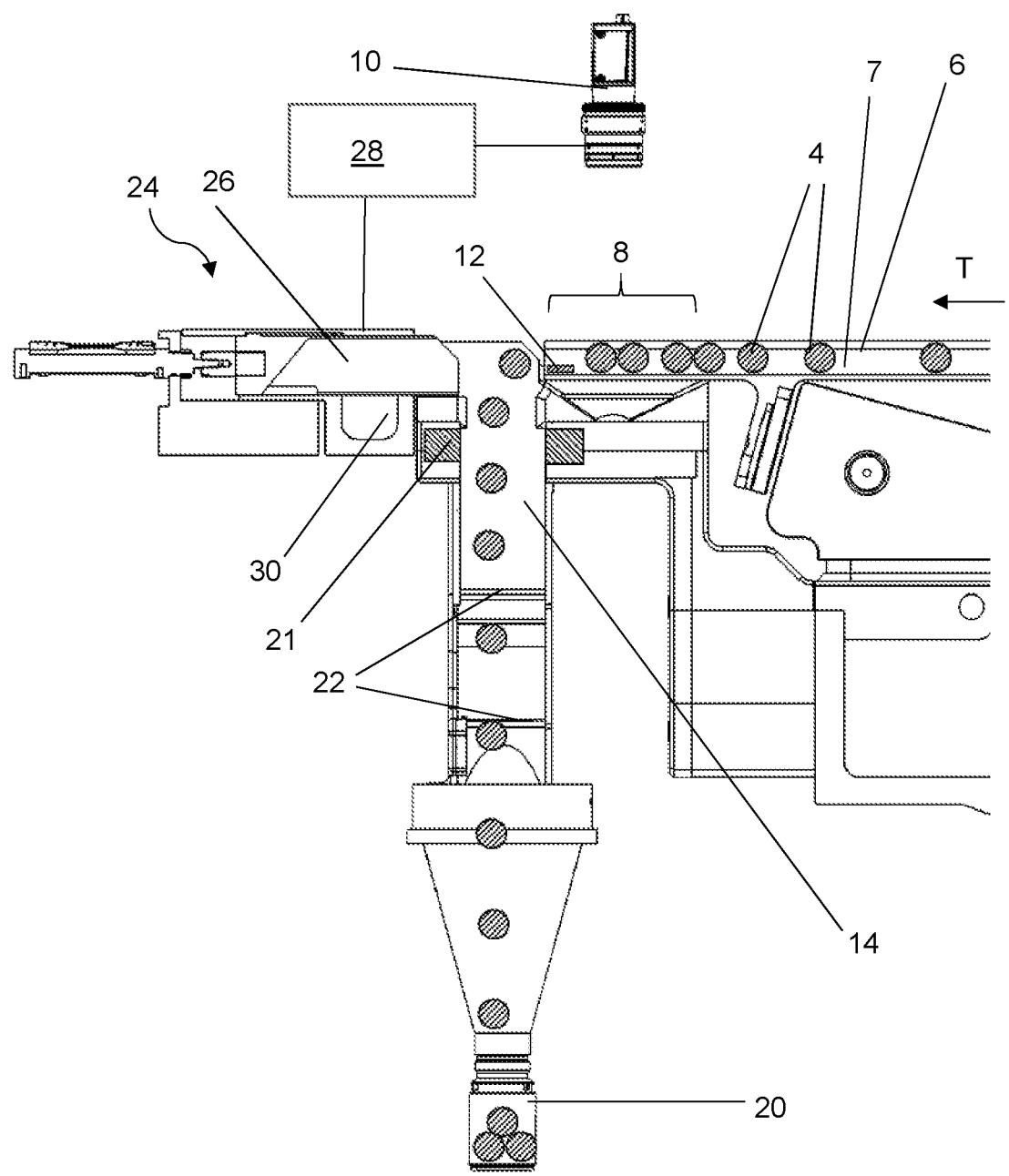
Figure 8:
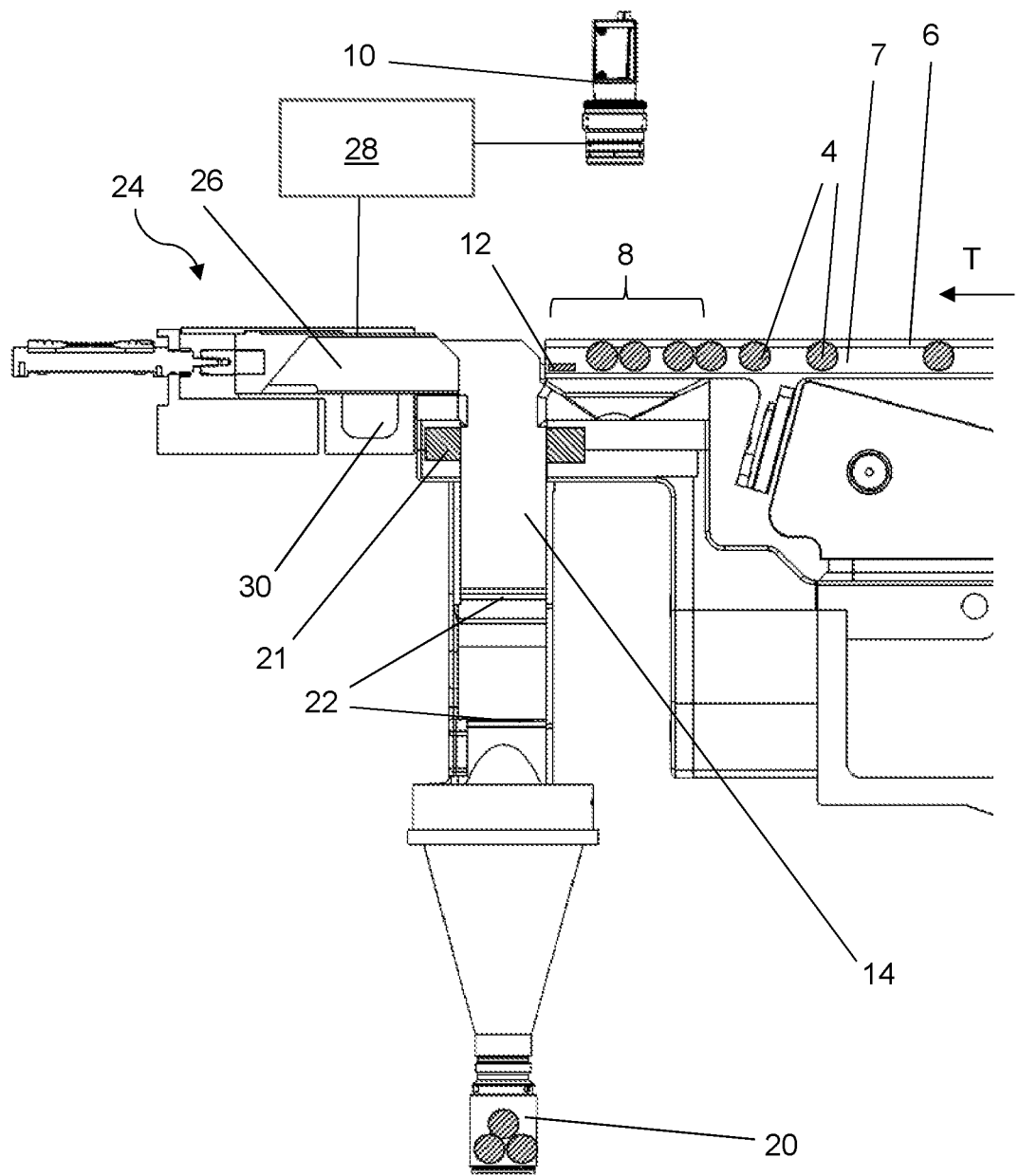
Figure 9:
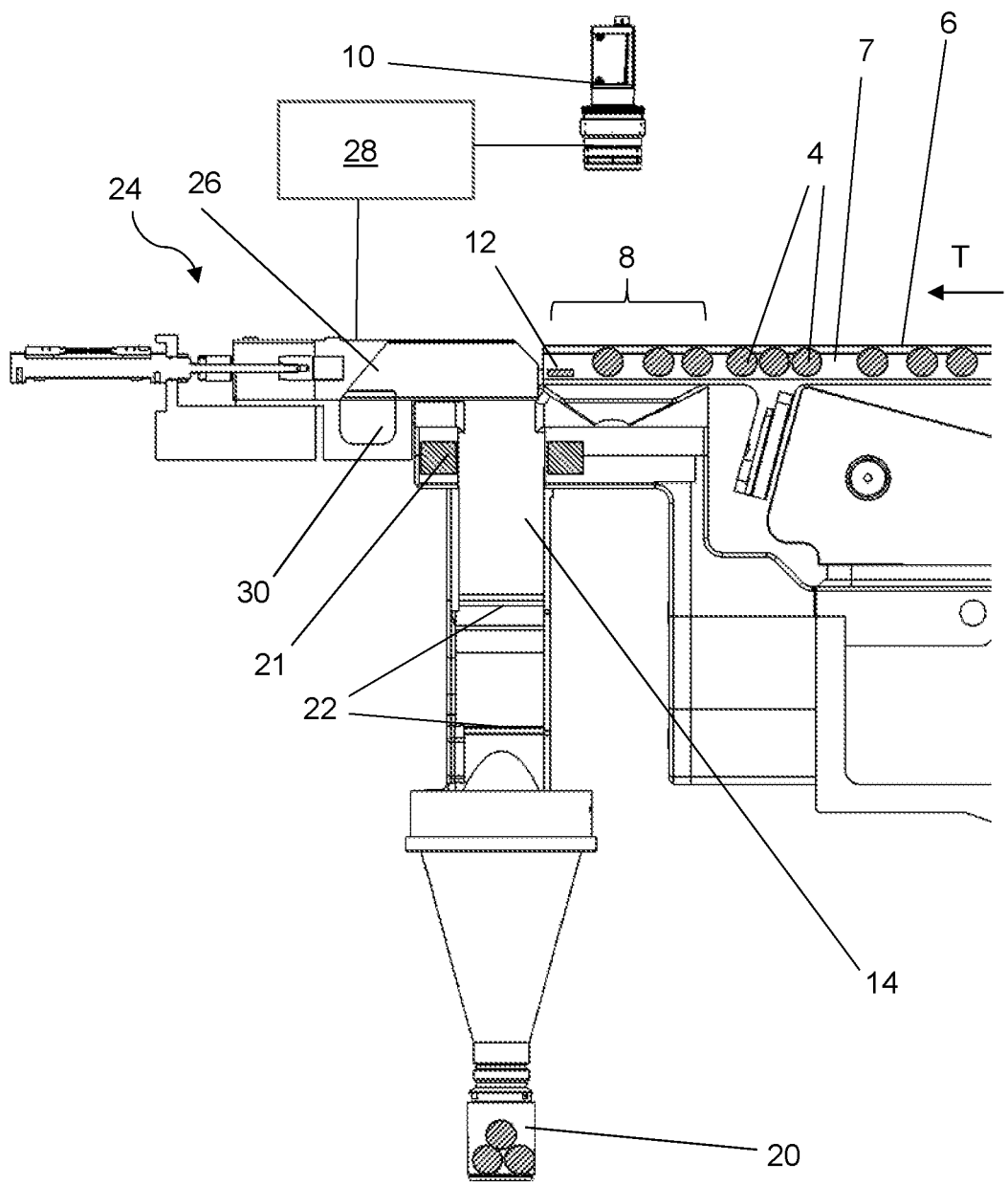

FIG. 5 shows an initial situation, which corresponds to the situation shown in FIG. 1. Medical products 4 are conveyed on the oscillating conveyor 6, fall through the shaft 14, and are loaded into containers 20. In the area of the oscillating conveyor 6 on the right, a defective product 12, represented as a broken piece, can already be seen. In FIG. 6, the defective product 12 has arrived adjacent to the delivery area 8 of the conveying lane 7. In FIG. 7, the defective product 12 has been detected by the detection device 10, and the vibration of the oscillating conveyor 6 has been turned off.

Figure 10:
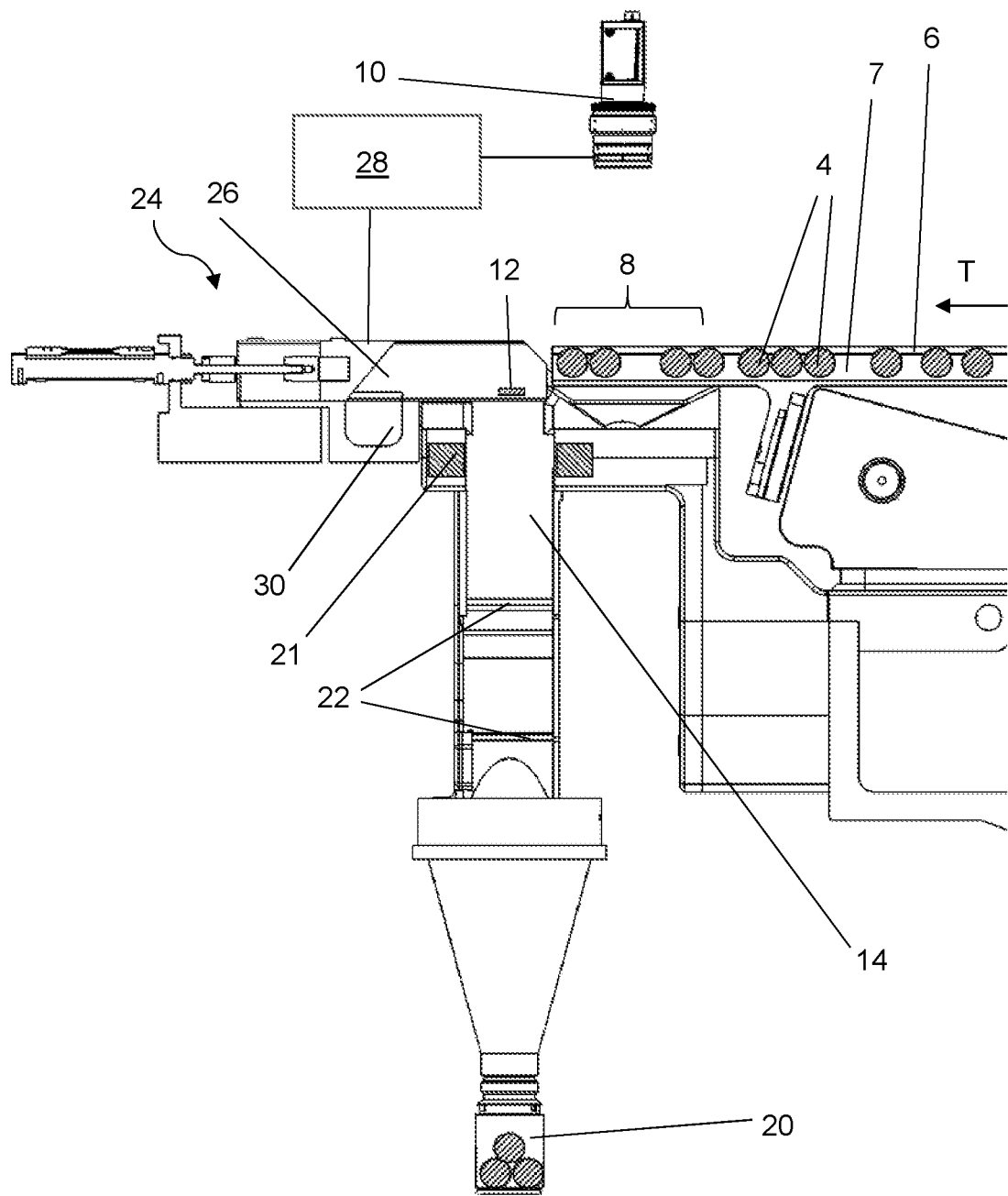

The defective product 12 is therefore in a stationary position at an edge of the conveying lane 7. Preferably, there is a waiting period in this position until all of the medical products 4 have been transferred from the associated shaft 14 into the containers 20 (FIG. 8) or have come to rest on the slide valves 22. Then, the diverter device 26 is moved into the activated position (FIG. 9), and the oscillating conveyor 6 is turned back on (FIG. 10).

Figure 11:
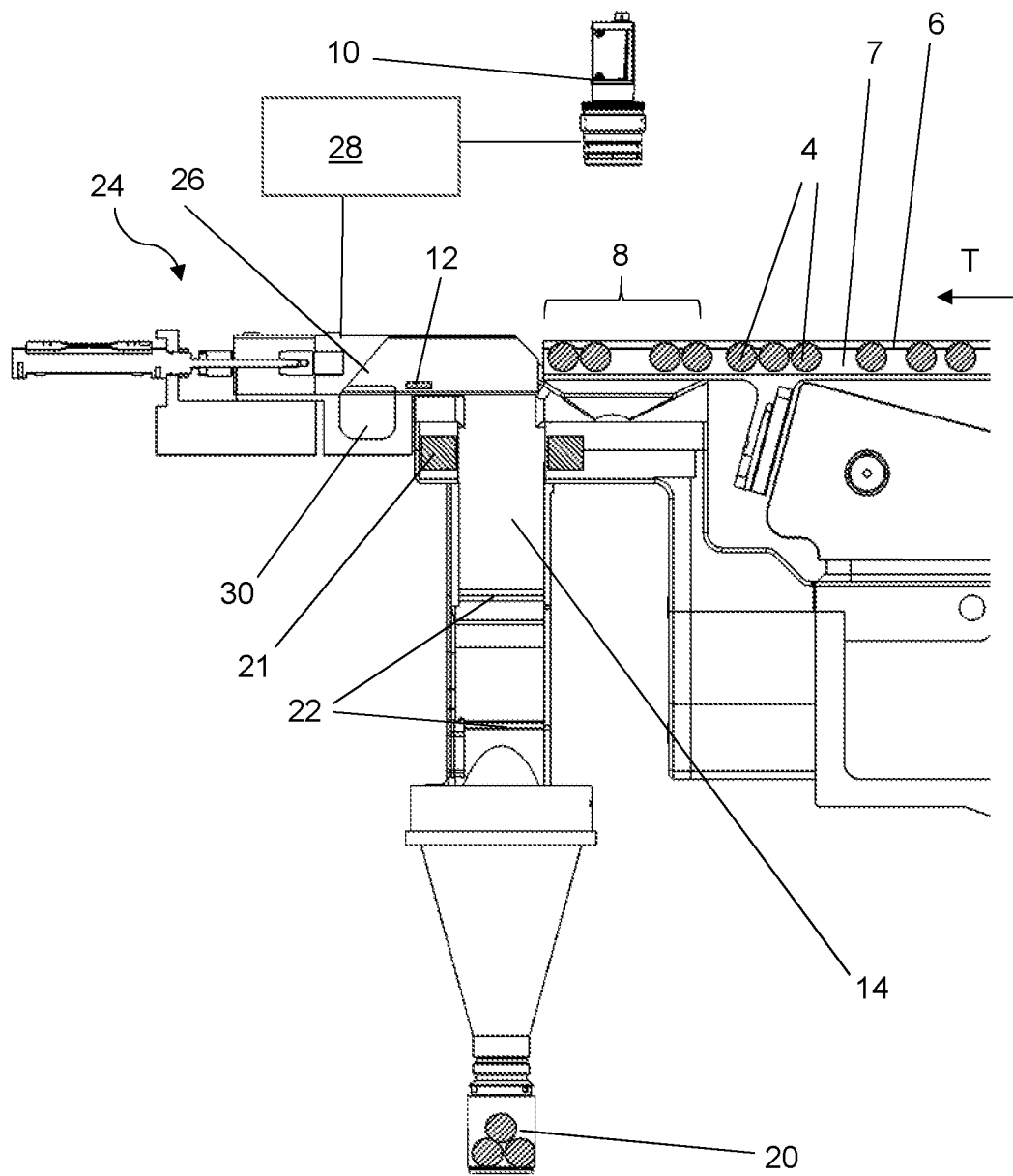
Figure 12:
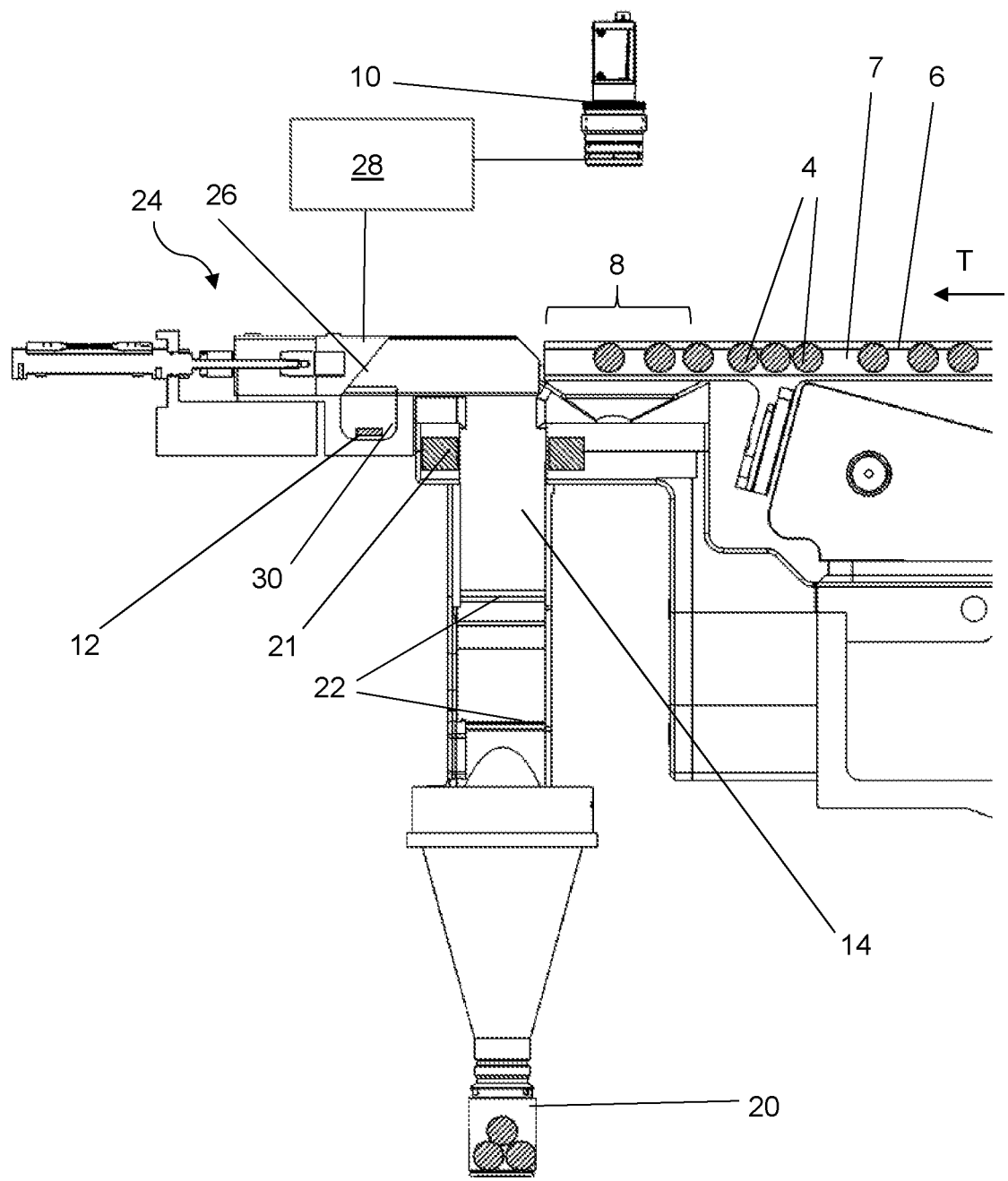
Figure 13:
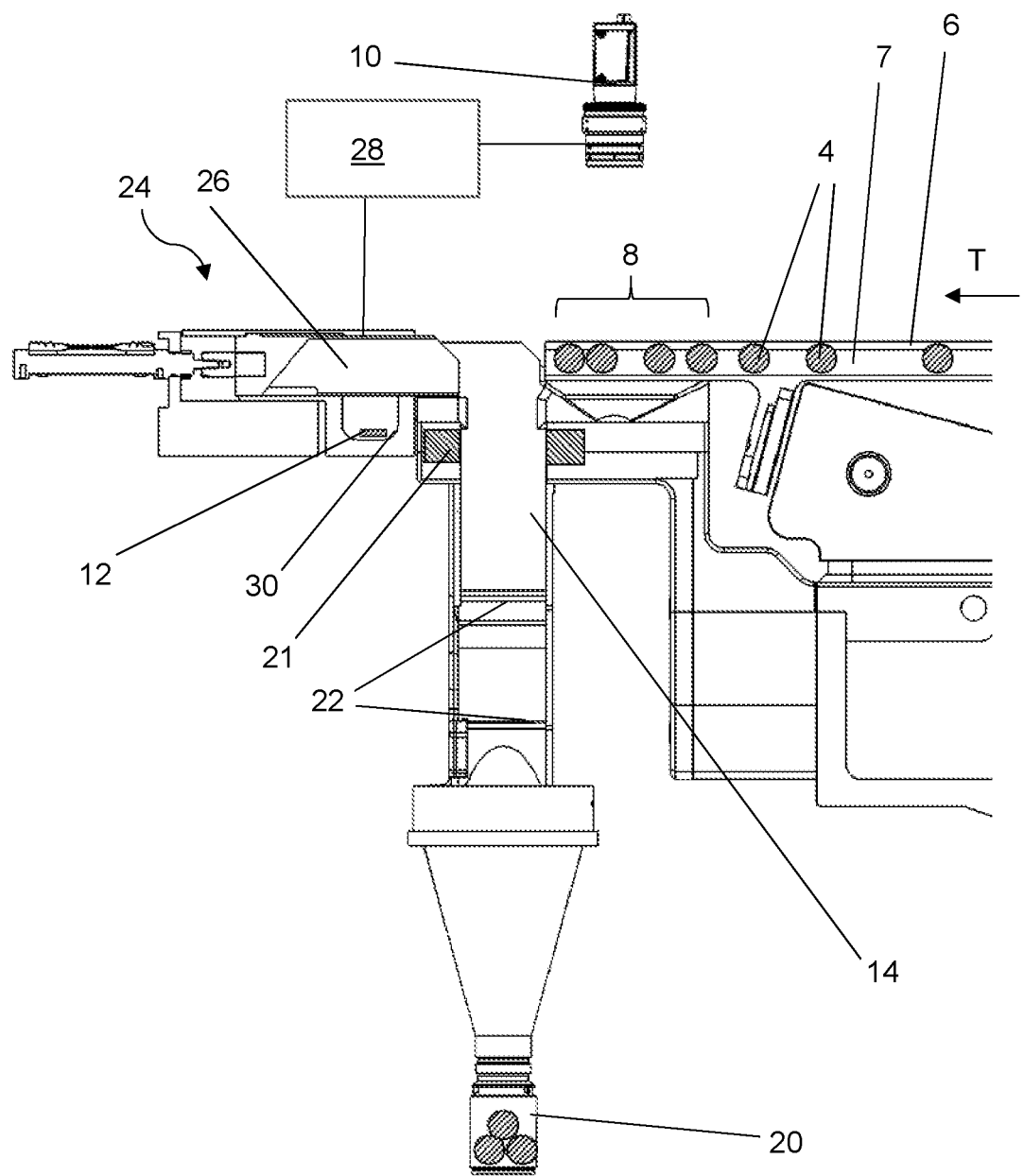

The suction device 30 is turned on, and the defective product 12 which has entered the diverter device 26 is rapidly suctioned off (FIGS. 11 and 12). The detection device 10 monitors the ejection process of the defective product 12 by observing the delivery area 8 of the conveying lane 7. As soon as the detection device 10 is no longer able to detect a defective product 12, the diverter device 26 can be moved back into the deactivated position (FIG. 13). After that, the process of filling the containers 20 with medical products 4 can be continued in a normal manner.

As soon as the diverter device 26 has been moved into the activated position, the counting sensor 21 is in a monitoring mode. When the diverter device 26 is in the activated position, no product should be passing by the counting sensor 21. Otherwise, it must be assumed that this product is the defective product 12, which has nevertheless unintentionally arrived in the shaft 14. In such a situation, when a product is detected by the counting sensor 21, an interrupt sequence of the filling process is initiated, which, for example, consists of the removal of all of the containers 20 to be filled at this time and the removal of the medical products 4 present in the shaft 14. The machine is also usually stopped as well.

For example, the monitoring mode of the counting sensor 21 begins when the oscillating conveyor 6 stops and ends at the time when the oscillating conveyor 6 is turned back on again, possibly after an additional time value. This additional time value is preferably the time which a product requires to fall from the height of the conveying lane 7 to the area of the counting sensor 21.

It is not absolutely necessary to shut down the oscillating conveyor 6 as soon as the defective product 12 has entered the delivery area 8 of the associated conveying lane 7. Under certain conditions, it is also possible to allow the oscillating conveyor 6 to continue to operate, as long as the control unit 28 takes into account the speed of the defective product 12 on the conveying lane 7 and moves the diverter device 26 into the activated position at the proper time in the particular case.

In certain configurations, it can also be sufficient to keep the oscillating conveyor 6 at a standstill until the suction device 30 has suctioned the defective product 12 directly away from the delivery area 8 of the conveying lane 7. Then, the oscillating conveyor 6 would be set into vibration again only after the detection device 10 has determined that a defective product 12 has been removed from the conveying lane 7 and the diverter device 26 has been moved back again into the deactivated position.

Finally, it can also be necessary or advantageous, during the sequence of steps described on the basis of FIGS. 5 to 13, to turn the oscillating conveyor 6 off again as soon as the defective product 12 has been removed from the delivery area 8 of the conveying lane 7 or as soon as the detection device 10 is no longer able to detect a defective product 12.

To ensure that the defective product 12 or the defective products 12 have been reliably suctioned off, the diverter device 26 can be kept in the activated position for another certain length of time and the suction device 30 can also remain turned on. The diverter device 26 is then moved into the deactivated position, and the suction device 26 is turned off.

The invention claimed is:

1. A device for transferring medical products comprising:
   an oscillating conveyor having a plurality of conveying lanes arranged next to each other for conveying the medical products to a delivery area of the plurality of conveying lanes;
   a detection device for detecting defective products in each of the plurality of conveying lanes;
   at least one shaft having a receiving opening arranged adjacent to the delivery area of at least one of the plurality of conveying lanes for conveying the medical products emerging from one or more of the plurality of conveying lanes to a filling area, wherein the plurality of conveying lanes and the at least one shaft together define a plurality of transport paths for the medical products;
   a diverter unit for defective products, which is arranged adjacent to the delivery area of the plurality of conveying lanes and which comprises at least one diverter device; and
   a control device, which is configured to activate the at least one diverter device upon detection of a defective product by the detection device;
   wherein the at least one diverter device is supported shiftably or pivotably and is movable between a deactivated position, in which the at least one diverter device is arranged outside of each of the transport paths of the medical products, and an activated position, in which the at least one diverter device is arranged in at least one of the transport paths of the medical products.

2. The device according to claim 1, wherein, in the activated position, the at least one diverter device is arranged in or adjacent to the delivery area of at least one of the plurality of conveying lanes and causes a change in at least one of the transport paths of the medical products.

3. The device according to claim 1, wherein, in the activated position, the at least one diverter device forms an extension of at least one of the plurality of conveying lanes.

4. The device according to claim 1, wherein, in the activated position, the at least one diverter device is decoupled from oscillations of the plurality of conveying lanes.

5. The device according to claim 1, wherein the at least one diverter device is shiftable in a substantially horizontal direction.

6. The device according to claim 1, wherein the diverter unit comprises a separate diverter device for each of the plurality of conveying lanes.

7. The device according to claim 1, wherein the diverter unit comprises at least one suction device for defective products.

8. The device according to claim 1, wherein the detection device comprises a camera system having at least one camera arranged above at least one of the plurality of conveying lanes.

* * * * *